United States Patent
Testa et al.

(10) Patent No.: US 7,120,328 B2
(45) Date of Patent: Oct. 10, 2006

(54) SCALABLE, MODULAR, STRICTLY NON-BLOCKING ELECTRO-OPTICAL CROSS CONNECT CORE

(75) Inventors: Francesco Testa, Pomezia (IT); Fabio Tomei, Rome (IT)

(73) Assignee: Telefonaktiebolaget LM Ericsson, Stockholm (SE)

(*) Notice: Subject to any disclaimer, the term of this patent is extended or adjusted under 35 U.S.C. 154(b) by 184 days.

(21) Appl. No.: 10/487,739

(22) PCT Filed: Aug. 31, 2001

(86) PCT No.: PCT/IT01/00453

§ 371 (c)(1),
(2), (4) Date: Feb. 25, 2004

(87) PCT Pub. No.: WO03/019975

PCT Pub. Date: Mar. 6, 2003

(65) Prior Publication Data

US 2004/0240883 A1    Dec. 2, 2004

(51) Int. Cl.
    *G02B 6/35*    (2006.01)
(52) U.S. Cl. ....................................... 385/17
(58) Field of Classification Search ............... None
    See application file for complete search history.

(56) References Cited

U.S. PATENT DOCUMENTS

| 4,173,713 | A | * | 11/1979 | Giesken et al. ............. 370/374 |
| 4,983,961 | A | * | 1/1991 | Brunle et al. .............. 340/2.22 |
| 5,103,220 | A | * | 4/1992 | Brunle .................... 340/2.22 |
| 5,303,383 | A | * | 4/1994 | Neches et al. ............... 712/43 |
| 5,889,600 | A | * | 3/1999 | McGuire .................... 398/50 |
| 6,335,992 | B1 | * | 1/2002 | Bala et al. .................. 385/17 |
| 6,370,295 | B1 |  | 4/2002 | Lebouetté et al. |
| 6,614,904 | B1 | * | 9/2003 | Fyne .......................... 379/271 |
| 2003/0099247 | A1 | * | 5/2003 | Toutant et al. ............. 370/401 |

FOREIGN PATENT DOCUMENTS

| DE | 1130482 | 5/1962 |
| EP | 1026912 | 8/2000 |

(Continued)

OTHER PUBLICATIONS

Shih-Chian Yang et al: "Reconfigurable Fault Tolerant Networks for Fast Packet Switching" IEEE Transactions of Reliability, IEEE Inc. New York, US, vol. 40, No. 4, Oct. 1, 1991, pp. 474-487, XP000232098 ISSN: 0018-9529 figure 14.

(Continued)

*Primary Examiner*—Sung Pak
*Assistant Examiner*—M. J. Stahl
(74) *Attorney, Agent, or Firm*—Nixon & Vanderhye P.C.

(57) ABSTRACT

An OXC core uses electronic and/or optical switch elements as building blocks and a three stage interconnection architecture according to Clos theorem (Clos configuration), to achieve the strictly non-blocking condition. The hardware architecture of the OXC core is carried out with scalable, modular board elements of two kinds, one active and the other passive, as well as with a backplane interconnecting the board elements. The number of board elements determines the size of the OXC core. Elementary switching matrices belonging to each stage of the Clos configuration are all contained in the active elements. The passive elements may be exclusively electric or exclusively optical. In the all-optical case, they are comprised of optical fibers or optical waveguides. The backplane is provided for the maximum size of the OXC core, and at least one active element and three passive elements inserted into the backplane. Passive elements can be replaced at any time with further active ones.

18 Claims, 7 Drawing Sheets

FOREIGN PATENT DOCUMENTS

GB          950579          2/1964

OTHER PUBLICATIONS

International Preliminary Examination Report completed Aug. 21, 2003 in corresponding PCT Application PCT/IT01/00453.

Paul Bonenfant and Antonio Rodriguez-Moral; "Optical Data Networking;" IEEE Communications Magazine; Mar. 2000; pp. 63-70.

R. I. MacDonald; "Large Modular Expandable Optical Switching Matrices;" IEEE Photonics Technology Letters, vol. 11, No. 6; Jun. 1999; pp. 668-670.

* cited by examiner

SCALABLE, MODULAR, STRICTLY NON-BLOCKING ELECTRO-OPTICAL CROSS CONNECT CORE

This application is the U.S. national phase of international application PCT/IT01/00453, filed in English on 31 Aug. 2001, which designated the U.S. The entire contents of these applications are incorporated herein by reference.

The present invention relates to the field of telecommunications and refers to a scalable, modular, strictly non-blocking electro-optical cross connect core.

It is known that the next generation of optical transport networks will have to provide global transport for both the legacy services and the new IP (Internet Provider) services and will have to allow automated lightpath provisioning, routing and restoration (on this subject, see: P. BONENFANT & A. RODRIGUEZ-MORAL: "Optical Data Networking", IEEE Communication Magazine, March 2000). To achieve that in an effective way, the Optical Transport Network needs to be flexible, reconfigurable, scalable and cost effective.

To provide flexibility and reconfigurability, optical cross connects (OXCs) have been developed and introduced in the optical transport networks. OXCs route high capacity data streams through the optical path layer. These apparatuses have to be independent from client signals (i.e., signal bit rate and characteristics) and protocol.

Moreover, OXCs should be scalable and expandable. Starting from a basic OXC size with a certain number of ports, it should be possible to reduce or expand easily the OXC size by reducing or increasing the number of boards. Cost optimization requires also a modular OXC implementation, i.e., all the boards constituting the OXC core must be equal.

A possible OXC architecture, to which the invention can be applied, is shown in FIG. 1 of the annexed drawings. A comb 1 of different wavelength, high capacity channels is transported on each of the input fibers 2. All the optical signals are demultiplexed in 3, prior to entering into the OXC core 4. The OXC core 4 must provide non-blocking characteristics in routing the wavelength signals.

Most of the OXC implementations make use of electronic switch elements as OXC internal building blocks. This is the case represented in FIG. 1, in which OXC core 4 is an electro-optical technology OXC core.

In order to achieve strictly non-blocking characteristics, conventional OXC cores use the well known Clos architecture (see: A. PATTAVINA: "Switching Theory", Wiley) in a full connected three stage network. It is built by interconnecting a large number of smaller size switch elements (or elementary switching matrices). This system assures strictly non-blocking features because it can route each of the N OXC core inputs in a N×N OXC, using effectively the number of matrix elements. But it is not effectively scalable.

In fact, due to the rigid structure of the Clos configuration, if the size of the N ports must be scaled, all of the OXC core interconnections must be modified as well. The scalability in this conventional architecture can be provided only by adding or reducing the number of switch elements in the two Clos outer stages. In any case, the size of the central stage has to be established according to the maximum size which is desired for the OXC system and has to be present always, even when low port count is required.

It is less attractive when the scalability involves only the outer stages because a customer is obliged to buy the central stage with the available maximum size, even if the customer needs only very few ports, with few outer stage elements.

In order to avoid the initial investment for the maximum size central stage, some implementations of the OXC cores in the Clos configuration use a central stage only with the needed size. But when the OXC system is scaled, a manual interconnection rearrangement among the switch elements has to be done. This solution is not very attractive for network operators because any time the OXC has to be scaled, a skilled person must manually modify the OXC core, thereby increasing cost and time consumption.

In another configuration, called SKOL (see: R. i. McDONALD: "Large Modular Expandable Optical Switching Matrices", IEEE Phot. Tech. Letters, Vol. 11, No. 6, June 1999), there is no longer a concentrated central stage like in the Clos architecture, because the central stage is rearranged among the different input/output modules. The advantage of the SKOL architecture is that it avoids the need to always adopt the maximum size for the central stage. But it has the drawback of being always oversized (compared with Clos architecture), a problem that increases with the number of ports.

The new kind of OXC core according to the invention uses electronic and/or optical switch elements as building blocks and a three stage interconnection architecture that also fulfils the Clos theorem to achieve the strictly non blocking feature. The new OXC hardware architecture achieves scalability by subdividing the Clos configuration in scalable modules without oversizing. In other words, for a number N of ports, only the resources needed in the three stages of Clos are implemented.

The hardware architecture is carried out with scalable, modular board elements of two kinds, the one active and the other one passive, as well as with a backplane interconnecting the board elements. The number of the board elements determines the size of the OXC core. Preferably, the elementary switching matrices belonging to each stage of the Clos configuration are all contained in the active ones of said elements. The passive elements may be exclusively electric or exclusively optical. In the latter case, they include optical fibers or optical waveguides. The backplane is always provided for the maximum size of the OXC core itself. At least one active element and three passive elements are associated, in the smallest size of the OXC core, with the backplane. The passive elements can be replaced at any time with further active ones.

The invention will be described in the following in further detail, by way of example, referring to annexed drawings, in which.

Figure 1:
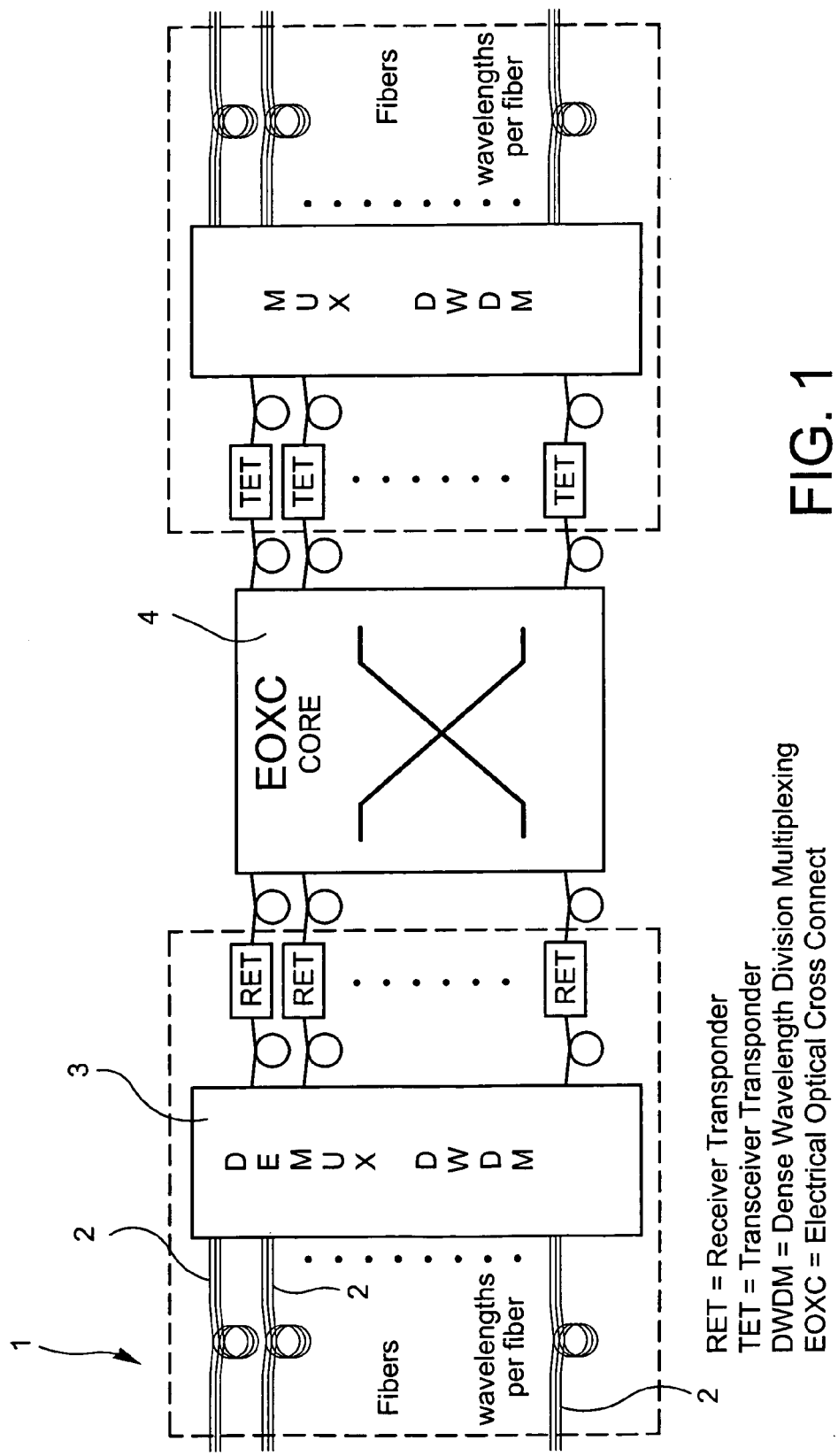
FIG. 1 illustrates the architecture of an OXC apparatus.

As shown in the drawings, (FIGS. 2–5) the hardware architecture of the OXC core is carried out with scalable, modular board elements of two kinds, the one active (board PA) and the other one passive (board PB), as well as with a backplane interconnecting the board elements (not explicitly illustrated in the figures). The elementary switching matrices of every stage of the Clos configuration are all contained in the active ones of said elements or boards.

As also can be seen from the drawings (FIGS. 2–5), all three elementary switching matrices of every line of the Clos configuration belong to a single board PA, which gives the system the modularity and compactness necessary to ensure good cost features. The scalability is achieved by adding or taking away active and passive boards in the OXC core or substituting them with one another. In this way only one central stage of the desired size is provided in the system.

Figure 2:
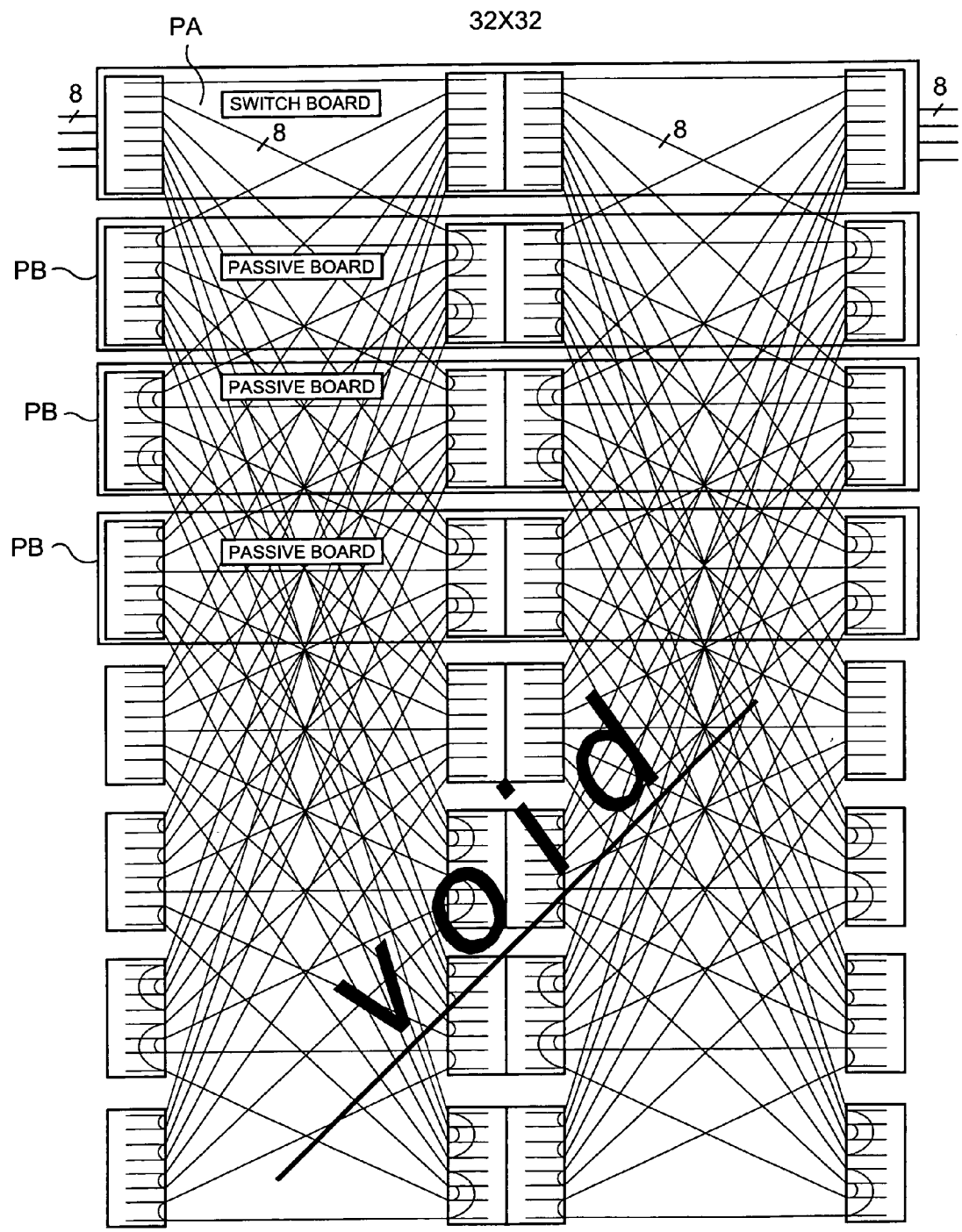
FIG. 2 shows an OXC core with 32×32 ports.
Figure 3:
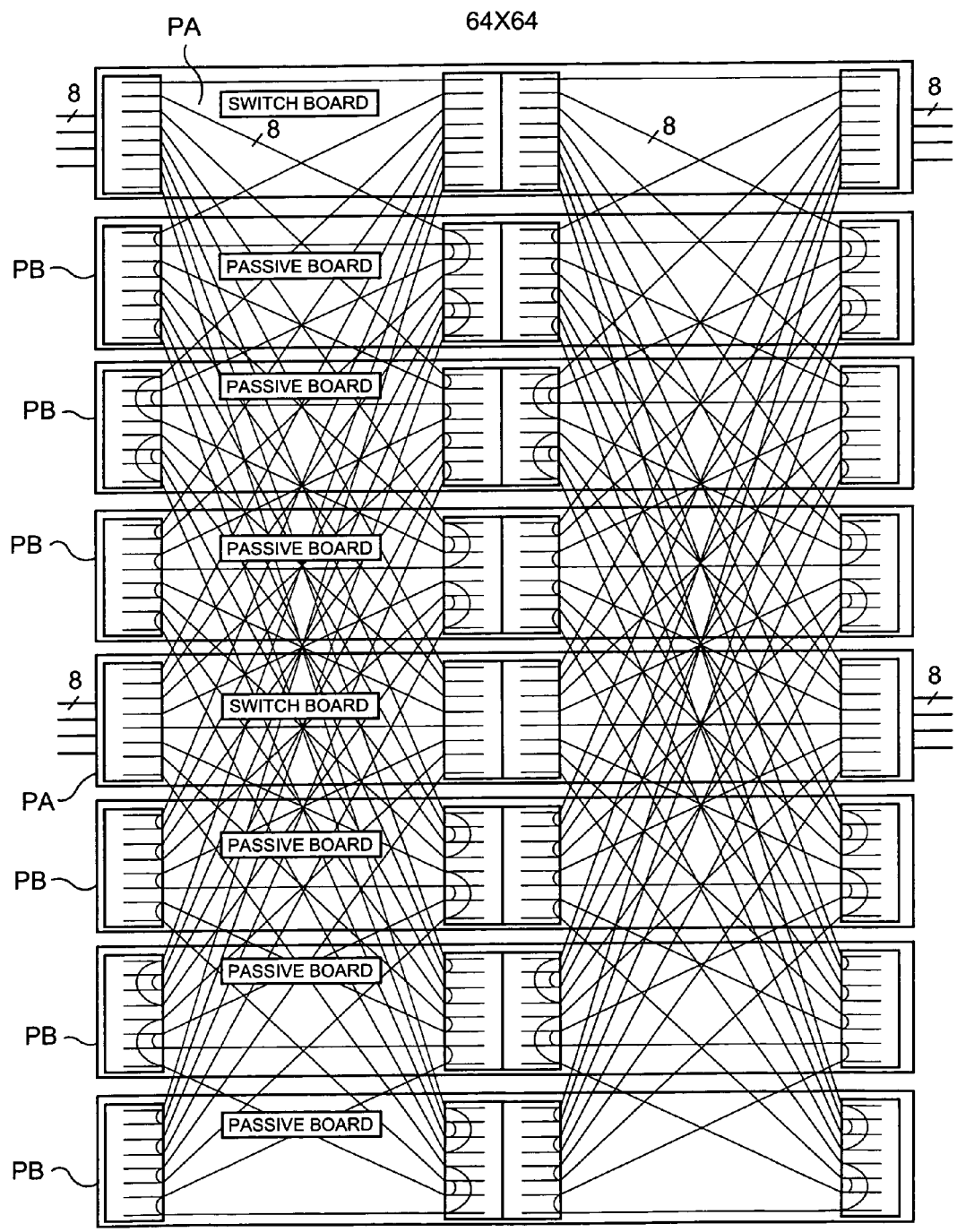
FIGS. 3, 4, 5 show OXC cores with 64×64, 128×128 and 256×256 ports, respectively.
Figure 4:
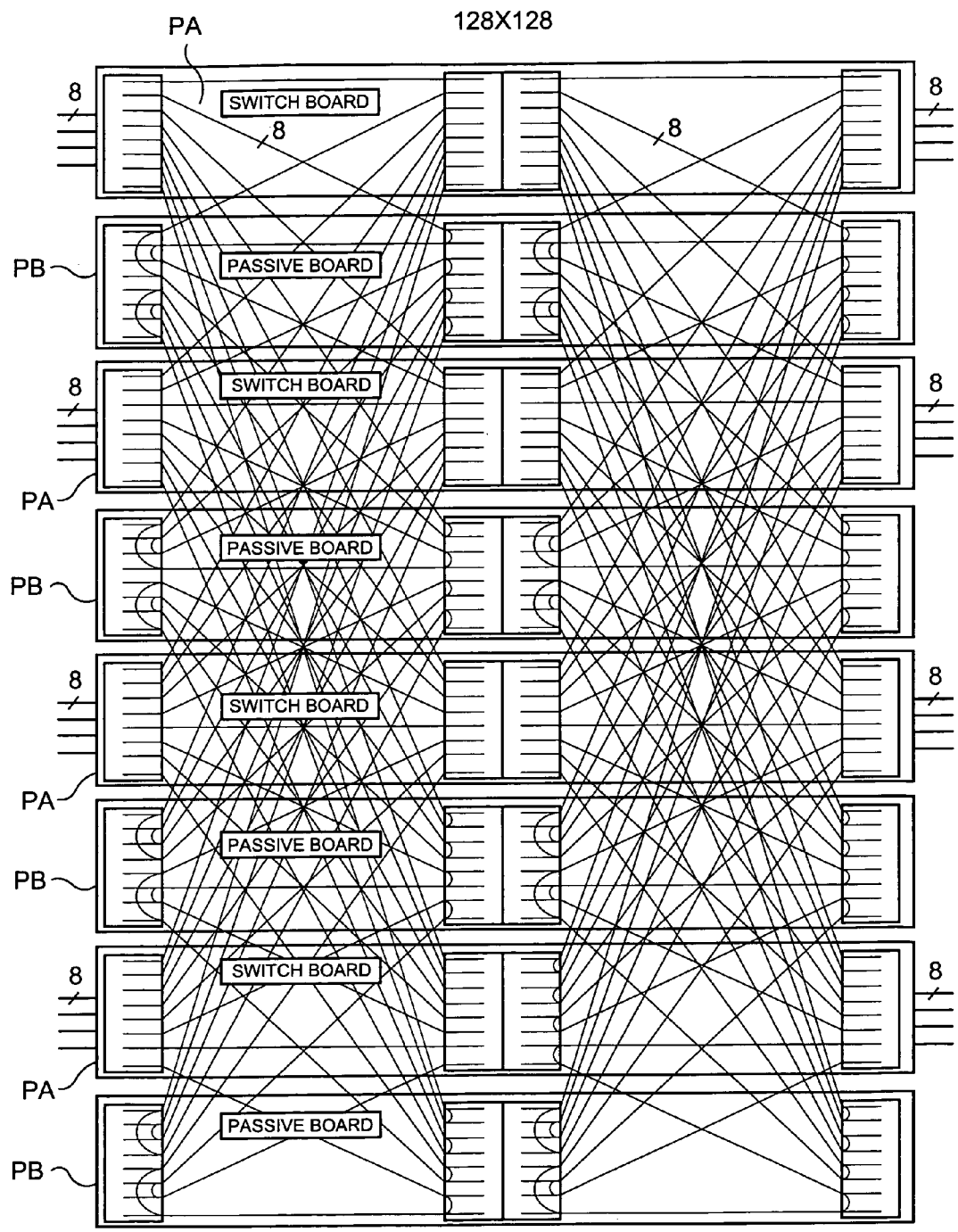

The 32×32 ports OXC core of FIG. 2, which represents a minimum sizing structure includes a single active board PA of elementary switching matrices and three passive boards PB. The rest of the board of the OXC core is empty. In the OXC cores of FIGS. 3 and 4, with 64×64 and 128×128 ports, respectively, two and four active boards PA are provided, respectively, with alternate two pairs of three passive boards and four passive boards PB, respectively. The 256×256 ports OXC core of FIG. 5, which represents the maximum sizing structure includes eight active boards PA and no passive board PB.

Suitable interconnections between active boards PA are obtained by employing passive boards PB. These can be exclusively electric or exclusively optical. In the optical case, the interconnections may be optical fibers or optical waveguides.

In both cases, passive boards PB allow a simple and quick readjustment of the system when the OXC core is scaled. The interconnection with the backplane is provided for the maximum sizing, with the maximum number of present active boards. If the OXC core must be scaled, just two simple conditions must be fulfilled: (1) only the number of required switch boards are present and the excess boards are removed, and (2) the starting interconnections between boards are suitably readjusted to obtain a new configuration. To obtain the suitable interconnections for a scaled OXC core, the passive boards PB are used.

With the new OXC core architecture, it is possible to obtain both scalability and efficient use of the switch elements simply by implementing additional low cost modular passive boards that may be fully electric or exclusively optical.

Figure 7:
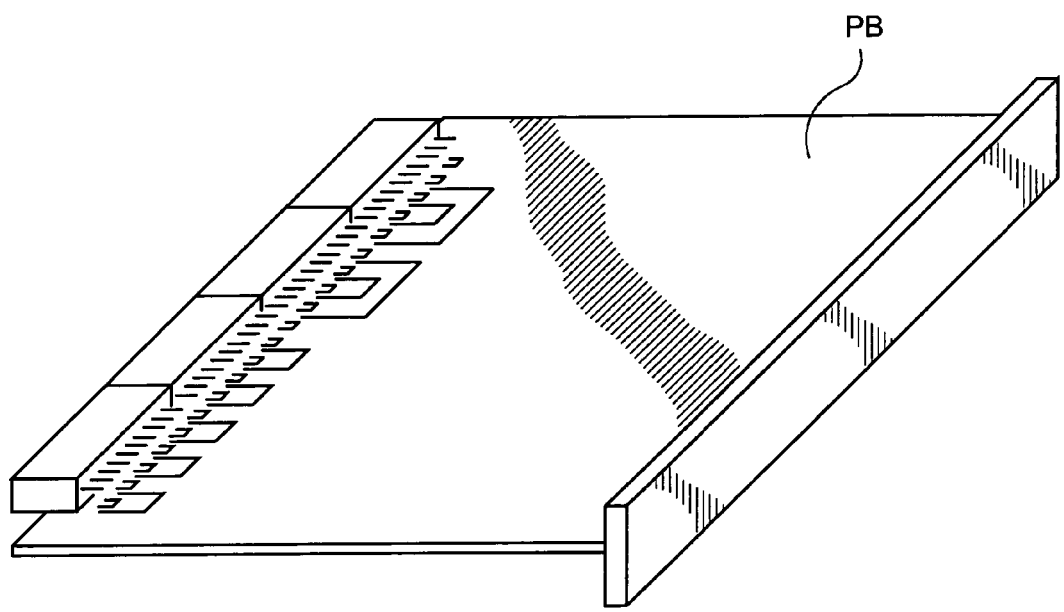
FIG. 7 illustrates in detail one of the passive elements of the OXC core of FIG. 2.

FIG. 7 schematically illustrates a possible implementation of a fully electric passive board PB, provided only with conductors and connectors.

Figure 5:
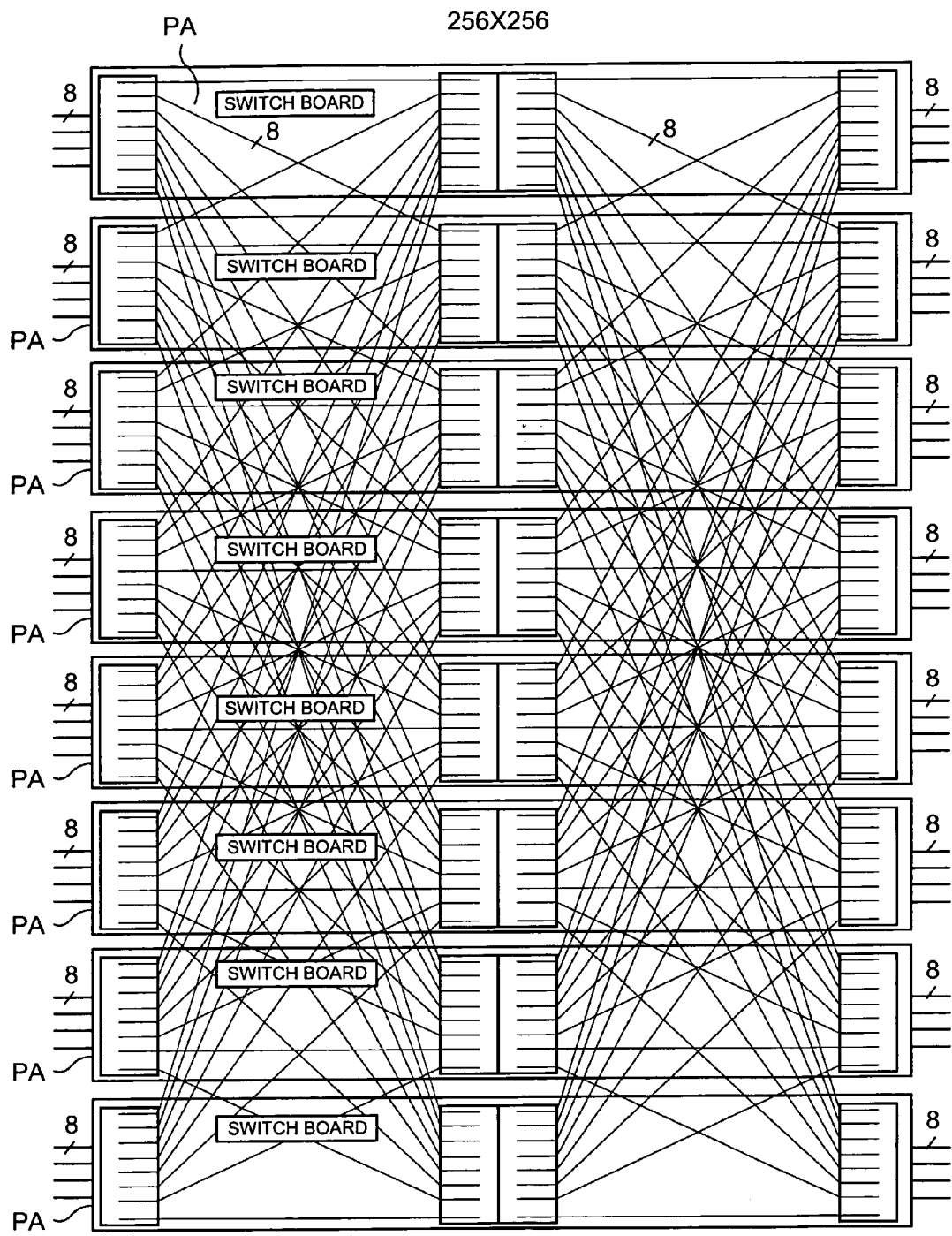
Figure 6:
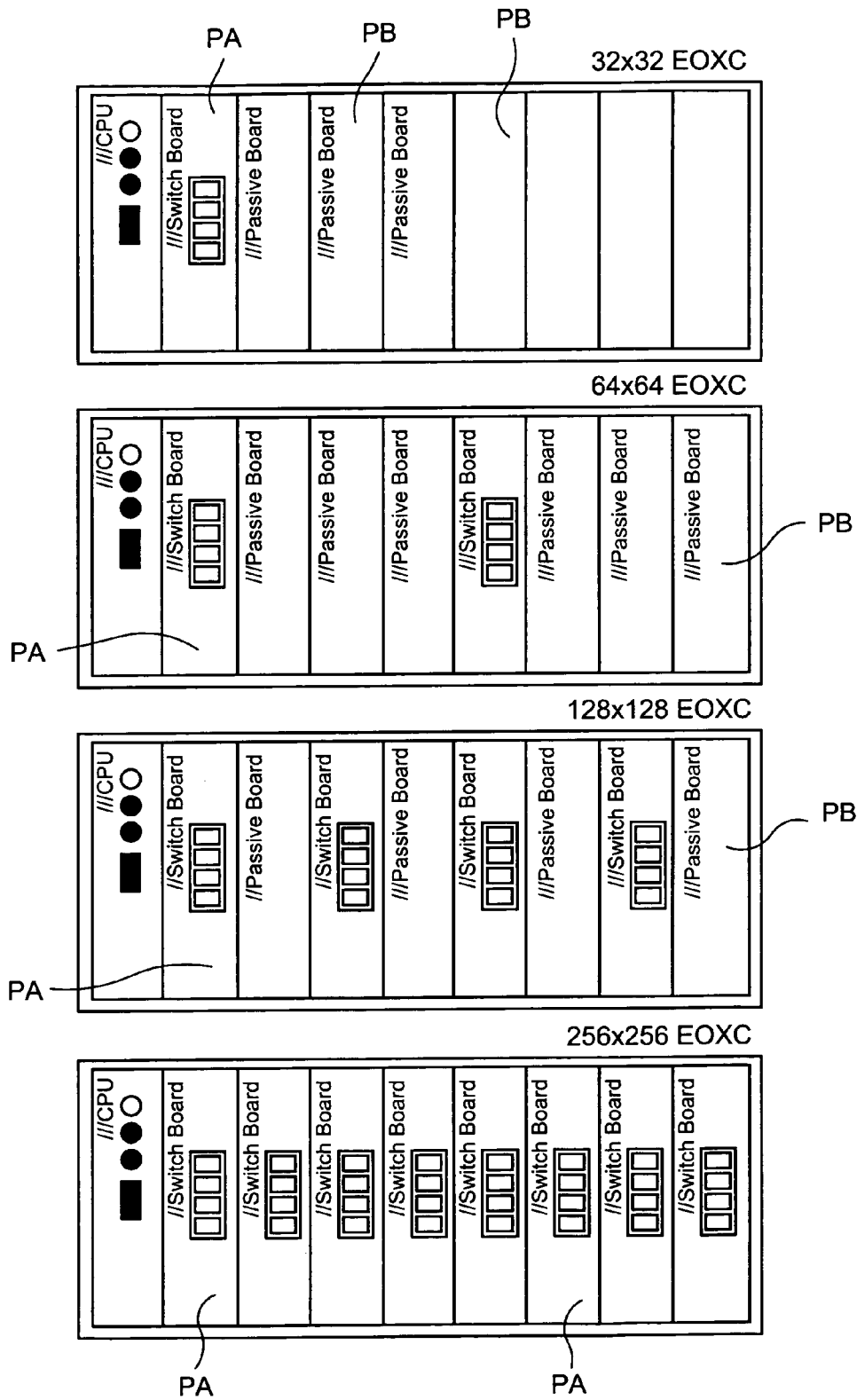
FIG. 6 is a scheme showing synthetically how an OXC can be equipped according to various configurations in order to obtain various sizes.

The high mechanical integration allowed results in a very compact OXC core which, also for its maximum-size 256× 256 port embodiment, illustrated in FIG. 5, can be contained in a single sub-rack. This is shown by FIG. 6, which also illustrates how the OXC core can assume, with the same sizes, different sizes, being equipped according to different configurations, corresponding to those of FIGS. 2–4.

Thus, an OXC core with non-blocking characteristics is provided with a simplified and efficient utilization of hardware while ensuring at the same time full modularity and scalability of the OXC core.

Of course, the practical embodiments of the improved OXC core falling within the scope of the present invention could be other than those disclosed and illustrated herein.

The invention claimed is:

1. An electro-optical cross connect core in telecommunications, comprising
    cross connect core ports;
    electronic and/or optical switch matrices interconnected in a three stage Clos architecture with respective interconnections, to achieve a strictly non-blocking condition,
    and a backplane,
    wherein
    the scalable architecture of said core being carried out with removable modular boards of only two kinds, the one active boards and the other one passive boards, switching matrices of all three stages architecture being implemented on each of said active boards and said passive boards being provided only with said respective interconnections,
    and said backplane interconnects said board elements, the number of said board elements determining the size of the core.

2. OXC core according to claim 1, in which said passive elements are exclusively electric.

3. OXC core according to claim 1, in which said passive elements are exclusively optical.

4. OXC core according to claim 3, in which said optical passive elements are comprised of optical fibers.

5. OXC core according to claim 3, in which said optical passive elements are comprised of optical waveguides.

6. OXC core according to claim 1, in which the backplane is provided for the maximum size of the OXC core itself.

7. OXC core according to claim 1, in which at least one active element and three passive elements are associated with the backplane, passive elements being able to be replaced at any time with further active ones.

8. An OXC core in telecommunications, comprising:
    electronic and/or optical switch elements as building blocks of three stage interconnection matrix architecture according to Clos configuration,
    an interconnecting backplane for mounting said switch elements,
    the architecture of said core being carried out with removable switching elements, wherein
    the three switching matrices of a single line of the Clos configuration belong to single removable active boards, and
    interconnections between said switch elements of the active boards are obtained by passive boards being fitted into said interconnecting backplane provided for the maximum sizing of the core.

9. An electro-optical cross connect core for use in telecommunications, comprising:
    cross-connect core ports;
    electronic and/or optical switch matrices interconnected in a three stage Clos architecture including an input switching matrix, a middle switching matrix, and an output switching matrix to achieve a strictly non-blocking condition for the electro-optical cross connect core;
    a backplane; and
    wherein the electro-optical cross connect core includes a scalable architecture having removable modular boards including one or more active boards and one or more passive boards,
    wherein the first, second, and third switching matrices of all three stages in a line of the Clos architecture are provided on each active board, with the passive boards lacking any of the switching matrices, and
    wherein the backplane interconnects active and passive boards inserted into the backplane.

10. An electro-optical cross connect core according to claim 9, wherein the passive boards are exclusively electric or exclusively optical.

11. An electro-optical cross connect core according to claim 9, wherein scalability of the OXC core is achieved without replacing or removing existing OXC boards.

12. An electro-optical cross connect core according to claim 10, wherein the optical passive boards are comprised of optical fibers or optical waveguides.

13. An electro-optical cross connect core according to claim 11, wherein a number of boards interconnected in the backplane determines a size of the electro-optical cross connect core.

14. An electro-optical cross connect core according to claim 9, wherein the backplane is provided for a maximum size of the OXC core for a desired scalability.

15. An electro-optical cross connect core according to claim 9, wherein at least one active board and three passive boards are inserted into the backplane, and wherein any one of the passive boards is replaceable at any time with a new active board.

16. An OXC core for use in telecommunications, comprising:
   electronic and/or optical switch elements as building blocks of a three stage interconnection matrix architecture according to a Clos configuration, and
   an interconnecting backplane,
   wherein the three stage switch elements of a single line of the Clos configuration are included in a single removable active board, and
   wherein interconnections between the switch elements of the active board inserted into the interconnecting backplane are made via passive boards inserted into the interconnecting backplane.

17. The OXC core in claim 16, wherein the interconnecting backplane is configured to provide for a maximum desired sizing of the core in order to accommodate a number of boards for a desired scalability of the OXC core.

18. The OXC core in claim 16, wherein scalability of the OXC core is achieved without replacing or removing existing OXC boards.

* * * * *